(12) United States Patent
Marchesini et al.

(10) Patent No.: US 11,130,080 B2
(45) Date of Patent: Sep. 28, 2021

(54) VERTICAL SEPARATOR FOR THE TREATMENT OF SLURRY

(71) Applicant: WAMGROUP S.p.A., Modena (IT)

(72) Inventors: Vainer Marchesini, San Prospero (IT); Marco Gaddi, San Prospero (IT)

(73) Assignee: WAMGROUP S.P.A., Modena (IT)

( * ) Notice: Subject to any disclaimer, the term of this patent is extended or adjusted under 35 U.S.C. 154(b) by 121 days.

(21) Appl. No.: 15/323,635

(22) PCT Filed: Jul. 14, 2015

(86) PCT No.: PCT/IB2015/055327
§ 371 (c)(1),
(2) Date: Jan. 3, 2017

(87) PCT Pub. No.: WO2016/009357
PCT Pub. Date: Jan. 21, 2016

(65) Prior Publication Data
US 2017/0144086 A1 May 25, 2017

(30) Foreign Application Priority Data

Jul. 14, 2014 (IT) .......................... BO2014A000402

(51) Int. Cl.
| | |
|---|---|
| *B01D 29/82* | (2006.01) |
| *B01D 29/11* | (2006.01) |
| *B01D 29/35* | (2006.01) |
| *B01D 35/26* | (2006.01) |
| *B01D 29/86* | (2006.01) |

(Continued)

(52) U.S. Cl.
CPC .......... *B01D 29/828* (2013.01); *B01D 29/117* (2013.01); *B01D 29/118* (2013.01); *B01D 29/356* (2013.01); *B01D 29/86* (2013.01); *B01D 35/26* (2013.01); *B30B 9/128* (2013.01); *B01D 29/6476* (2013.01); *B01D 29/92* (2013.01); *B01D 29/94* (2013.01)

(58) Field of Classification Search
CPC ............ B01D 21/2461; B01D 21/0018; B01D 21/0012; B01D 29/118; B01D 29/86; B01D 29/6476; B01D 29/828; B01D 29/356; B01D 29/94; B01D 29/92; B01D 35/26; B30B 9/128
See application file for complete search history.

(56) References Cited

U.S. PATENT DOCUMENTS 488,956 A * 12/1892 Sobotka .................... B30B 9/12
                                                      100/117
2,557,375 A * 6/1951 Dickenson ........... B01D 29/117
                                                      210/111

(Continued)

FOREIGN PATENT DOCUMENTS

WO    WO 2011/002317    1/2011

*Primary Examiner* — Liam Royce
(74) *Attorney, Agent, or Firm* — Leason Ellis LLP

(57) ABSTRACT

A vertical separator for the treatment of slurry includes a screen device with a vertical axis provided with a screen, a feeding device provided with a pump to feed the slurry to a screen device, a discharge device for the liquid part of the slurry, and a discharge device for the solid particles of the slurry. The screen device houses a counter-pressing device which is designed to generate a force which partially counters the pushing action exerted by the pump upon the slurry.

15 Claims, 2 Drawing Sheets

(51) Int. Cl.
*B30B 9/12* (2006.01)
*B01D 29/94* (2006.01)
*B01D 29/92* (2006.01)
*B01D 29/64* (2006.01)

(56) References Cited

U.S. PATENT DOCUMENTS

| | | | | |
|---|---|---|---|---|
| 3,035,511 A | * | 5/1962 | Dudley | B30B 9/128 |
| | | | | 100/117 |
| 3,143,956 A | | 8/1964 | Hurtig | |
| 3,606,831 A | * | 9/1971 | Hoffmann | B30B 9/128 |
| | | | | 100/145 |
| 4,007,016 A | * | 2/1977 | Weber | B01F 7/169 |
| | | | | 366/144 |
| 4,774,008 A | | 9/1988 | Roodenrijs | |
| 2003/0075489 A1 | | 4/2003 | Gunrunathan | |
| 2012/0103920 A1 | * | 5/2012 | Morgan | B01D 29/35 |
| | | | | 210/791 |
| 2014/0020561 A1 | * | 1/2014 | Aery | B01D 46/0021 |
| | | | | 96/224 |

\* cited by examiner

VERTICAL SEPARATOR FOR THE TREATMENT OF SLURRY

CROSS REFERENCE TO RELATED APPLICATIONS

The present application is a U.S. National Phase of International Patent Application PCT/IB2015/055327, filed on Jul. 14, 2015, which claims priority to Italian Application No. BO2014A000402, filed on Jul. 14, 2014, each of which is incorporated by reference as if expressly set forth in their respective entireties herein.

TECHNICAL FIELD

The present invention relates to a vertical separator for the treatment of slurry.

BACKGROUND ART

The present invention finds advantageous application in any process in which, given a slurry, the liquid phase must be separated from the solid phase (substantially consisting of an agglomeration of solid particles).

DISCLOSURE OF INVENTION

The aim of this process is to have, at the end, starting from a slurry, a first substantially liquid product and a second substantially solid product.

Vertical separators for slurries are well known, for example, in the field of waste water treatment.

A traditional vertical-axis separator usually comprises the following elements:

a feeding system to feed the slurry to a tubular screen device;

a tubular screen device with a vertical axis, which houses, on the inside, feeding and pushing means, which are designed to move and compress the slurry, as well as filtering means to filter the slurry flowing by;

a discharge device to discharge the liquid part of the slurry after the separation of the solid part, which substantially takes place on the inside of the tubular screen; and a discharge device to discharge the solid separated from the liquid part; this separation substantially takes place on the inside of the tubular screen by pressing the slurry against the wall of the screen and thanks to the filtering action of the holes provided on the screen itself.

Therefore, according to the present invention, there is provided a vertical separator according to claim 1 or to any of the Claims that directly or indirectly depend on claim 1.

The present invention also relates to a method for the treatment of slurry, characterized in that a dual pressing and counter-pressing action is exerted upon the slurry itself within an area provided with screen means.

The counter-pressing action is obtained through screw means.

BRIEF DESCRIPTION OF THE DRAWINGS

The present invention will be best understood upon perusal of the following detailed description of a preferred embodiment, which is provided by mere way of non-limiting example, with reference to the accompanying drawings, wherein.

BEST MODE FOR CARRYING OUT THE INVENTION

Figure 1:
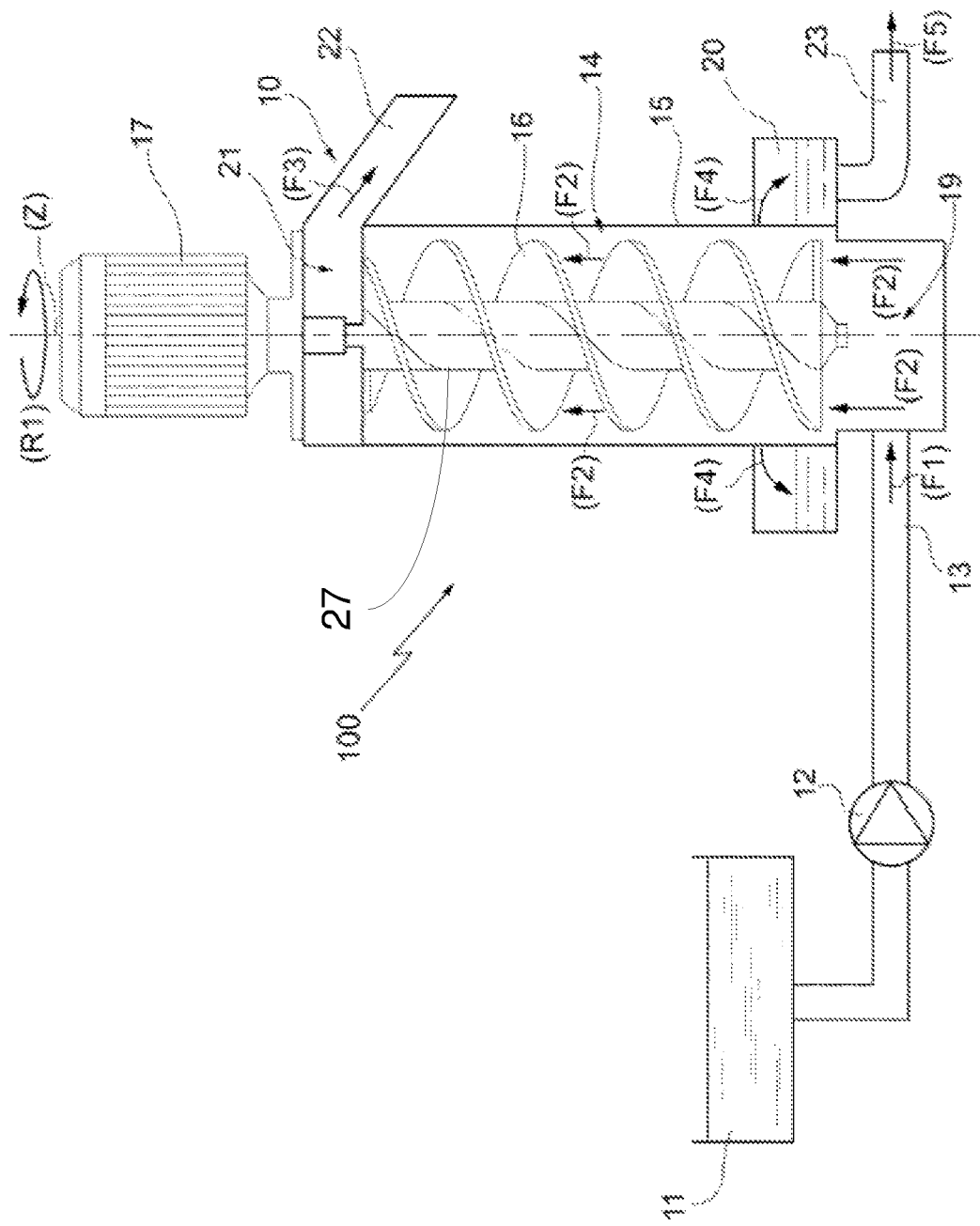
FIG. 1 shows a schematic view of a slurry treatment plant using a vertical separator according to the present invention.

In FIG. 1, number 100 indicates, as a whole, a plant for the treatment of slurries using a vertical separator 10 according to the present invention.

The plant 100 comprises, furthermore, a feeding tank containing the slurry to be purified and a pump 12, which pumps the slurry towards the bottom of the vertical separator 10 using a hydraulic pipe 13.

Figure 2:
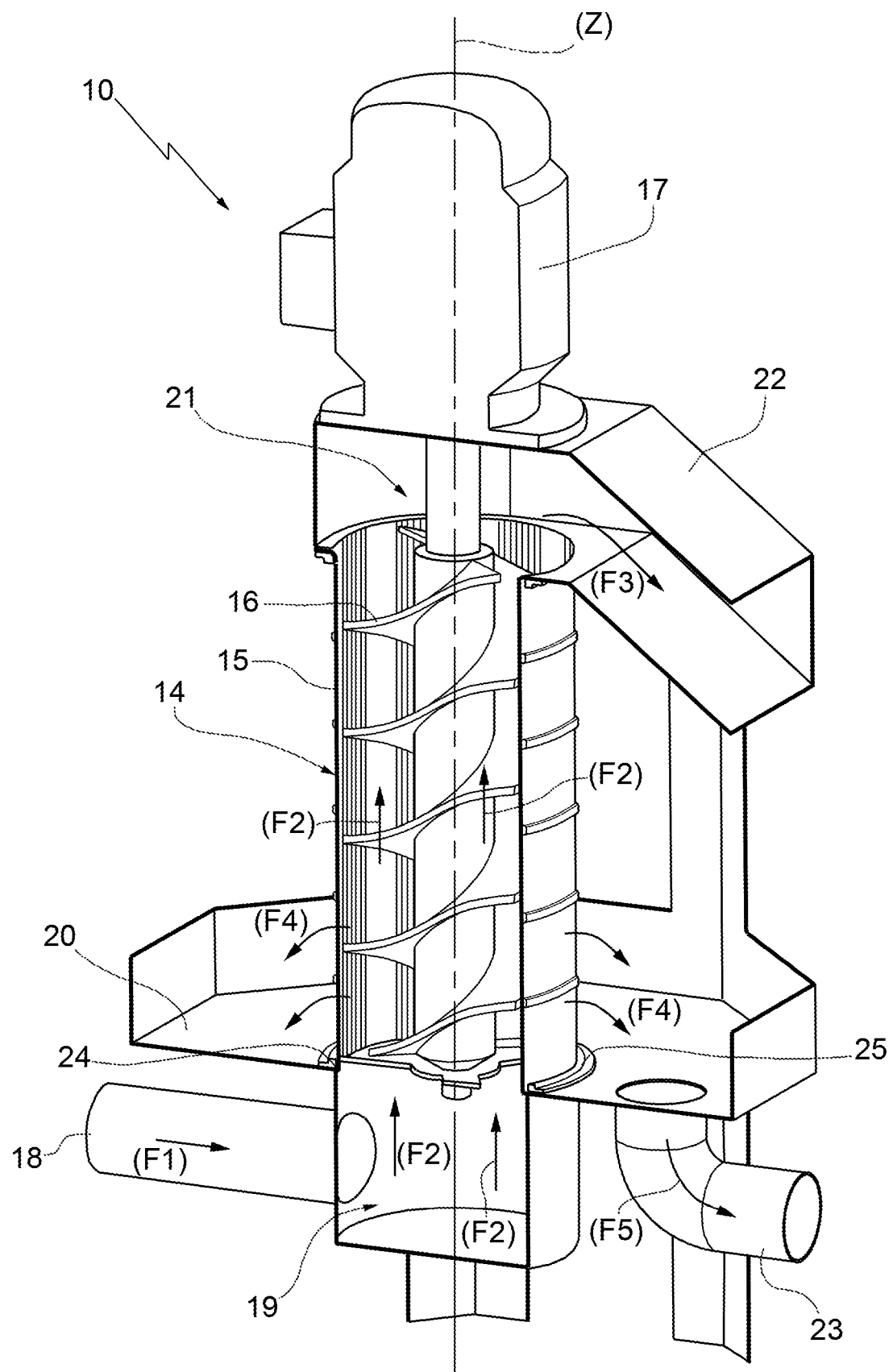
FIG. 2 shows three-dimensional, vertically sectional view of a vertical separator according to the present invention.

An embodiment of the vertical separator according to the present invention is shown more in detail in FIG. 2.

More in detail and with references to FIGS. 1 and 2, the vertical separator 10 comprises:

a tubular screen device 14 with a vertical axis (Z), which is provided with a screen 15 and houses, on the inside, a screw 16, which is caused to rotate by an electric motor 17 around the axis (Z) and according to a direction of rotation indicated by an arrow (R1); advantageously, though not necessarily, the electric motor is fixed to the upper portion of the tubular screen device 14;

a slurry feeding fitting 18 (hydraulically connected to the hydraulic pipe 13 of FIG. 1), which, following a direction and a path indicated by an arrow (F1), leads into a lower feeding chamber 19 of the tubular screen device 14;

a collecting tank 20 to collect the liquid part after the separation of the solid part, which substantially takes place on the inside of the tubular screen device 14;

an upper chamber 21 to collect the solid material separated from the slurry; and a discharge chute 22 to discharge the solid material from the upper chamber 21 by means of removing means (not shown) comprising, for example, a conveyor belt.

Advantageously, though not necessarily, the screw 16 is a screw with a continuous profile.

The screen 15 can be made of metal or of a filtering fabric, if necessary reinforced by a bearing structure.

A peculiarity of the vertical separator 10 according to the present invention lies in the fact that the screw 16 is wound around a central shaft 27 (with a vertical axis (Z)) in an opposite direction compared to the direction of rotation of the screw itself, which, as already mentioned above, is indicated by the arrow (R1).

In particular, as shown in FIG. 1, the screw 16, moving from the bottom to the top, is wound around the central shaft 27 (and to the axis (Z)) in a clockwise direction; on the contrary, both the central shaft and the screw 16 are caused to rotate, by the electric motor 17, in a counter-clockwise direction (arrow (R1)).

On the other hand, the screw 16, moving from the bottom to the top, can be wound around the vertical axis (Z) in a counter-clockwise direction, whereas the screw 16 can rotate in a clockwise direction.

After having filled the lower chamber 19, the slurry, due to the thrust exerted upon it by the pump 12, starts moving vertically in the tubular screen device 14 according to a direction and a path indicated by an arrow (F2).

In this way, in the cylindrical space delimited by the screen 15 and due to the rotation of the screw 16 according to (R1), a reaction is generated in the slurry, which counters the pushing action of the pump 12.

In other words, the direction in which the screw 16 is wound around the vertical axis (Z) and the direction of rotation of the screw itself (arrow (R1)) are chosen so as to generate a head that is opposite to the one of the pump 12.

Obviously, in order to allow the slurry to move from the bottom to the top according to the arrow (F2), the head of the pump 12 is greater than the one of the screw 16.

On the inside of the separator 10, there is a decreasing development of the pressure of the slurry, from the feeding pressure (almost equal to the one of the head of the pump 12) in the lower part of the screen 15 to the atmospheric pressure in the area of the fitting between the screen 15 and the discharge chute 22.

The effects of this dual action exerted upon the slurry are the following:

101. the solid particles that are larger than the holes of the screen 15 are intercepted, collected in the upper chamber and then discharged through the discharge chute 22 (arrow (F3));

whereas:

152. the solid particles that are smaller than the holes of the screen 15 and the liquid phase flow out of the screen 15 itself (arrow (F4)) and, after having flown through the collecting tank 20, are discharged by means of a drain 23 (arrow (F5)).

It is also well known that a possible deposit of solid particles on the inner wall of the screen 15 reduces the filtering ability thereof, thus limiting the flow of liquid (and of solid particles suspended therein, which are smaller than the holes of the screen) towards the tank 20 (arrow (F4)).

Therefore, this liquid, which, in these condition, cannot flow outwards (arrow (F4)) any longer, moves upwards (arrow (F2)) due to the prevailing action of the system (feeding pump 12+screw 16 rotating on the inside of the screen 15). This flow according to the arrow (F2), together with the turbulence generated by the screw 16, drags the solid particles deposited on the inner cylindrical surface of the screen 15 upwards, thus continuously cleaning the holes of the screen 15 itself, hence allowing its efficiency to increase.

Experiments have shown that overall results improve if the diameter of the inner cylindrical surface of the screen 15 is greater than the outer diameter of the crest of the screw 16. In other words, the filtering process is optimized if there is a gap between the crest of the screw 16 and the inner surface 15 of the screen.

Advantageously, though not necessarily, the difference between the diameter of the inner surface of the screen 15 and the diameter of the crest of the screw 16 ranges from 1 mm to 10 mm.

Furthermore, experiments have shown that the vertical separator according to the present invention deliver its best performances when the slurry to be treated has the following features:

1) the solid particles are smaller than 0.05 mm;
2) the concentration of the solid particles must not exceed 5%.

Furthermore, the best results are obtained when the screw 16 has a speed of rotation that is more than ten times greater than the one of traditional compactors. For example, particularly satisfactory results are obtained with speeds of rotation of the screw 16 ranging from 200 rpm to 1500 rpm.

Furthermore, advantageously, though not necessarily, a gasket 25 is arranged on the edge of a through hole 24 (FIG. 2) made on the bottom of the collecting tank 20.

More in particular, said gasket 25 is interposed between the outer surface of the tubular screen device 14 and the aforesaid edge of the through hole 24, not only to seal the through hole 24 itself, but also to act as a shock absorber element for the purpose of dampening the vibrations caused to the screen 15 by the indirect action of the screw 16 during filtering operations.

In a further embodiment (not shown herein) a gasket (similar or equal to the aforesaid gasket 25), possibly with a shock absorbing function, is used in the upper part of the screen 15; in particular, between the upper edge of the screen 15 and the edge of a through hole made in the discharge chute 22.

In a further embodiment (not shown herein) the screw comprises a plurality of modular loop assemblies, which are assembled together and are all coupled to a common central shaft provided with a peripheral groove. In other words, each loop-assembly comprises, first of all, a central hub provided with an inner groove, which, in use, is coupled to the aforesaid peripheral groove of the central shaft. The (substantially cylindrical) outer surface of the central hub of a given loop-assembly supports screw portions, which, in use, are coupled to screw portions belonging adjacent loop-assemblies.

Thus, by using these loop-assemblies (possibly having different geometrical and/or physical features) one can create, in a modular manner, screws with different lengths, pitches and outer diameters.

The main advantage of the vertical separator according to the present invention lies in its simplicity and compactness compared to systems having different filtering stations.

Furthermore, the use of this separator leads to a cleaner liquid fraction, thus increasing:
1-the possibilities of reuse of the separated liquid fraction;
2-savings in terms of costs for the disposal of the liquid phase; and
3-the reduction of nitrates.

The invention claimed is:

1. A vertical separator (10) for the treatment of slurry comprising a liquid part and solid particles, the vertical separator (10) comprising:
    a tubular screen device (14), with a vertical axis (Z), provided with a perforated filtering wall (15);
    a feeding device to feed the slurry to said tubular screen device (14); said feeding device comprising pumping means adapted to generate a head of the slurry having a momentum in a first direction (12) and being introduced to the vertical separator at a first location at which the feeding device interfaces with the vertical separator (10);
    a first discharge device (20, 23) to discharge the liquid part after the separation from at least one portion of the solid particles by the perforated filtering wall (15); and
    a second discharge device (21, 22) to discharge said at least one portion of the solid particles, the second discharge device being positioned axially opposite from the first discharge device across the screen device positioned between the first and second discharge devices;
    wherein said tubular screen device (14) houses counter-pressing means (16), which are designed to generate a force which partially counters the pushing action exerted by said pumping means (12) upon the slurry; and
    wherein said counter-pressing means (16) comprise screw means (16) that generates a counter-pressure force that is exerted on the slurry to separate the liquid part from the at least one portion of the solid particles;

said vertical separator (10) being characterized in that the direction in which said screw means (16) are wound around said vertical axis (Z) and the direction of rotation of said screw means (16) are chosen so as to generate a head that is opposite in direction to the first direction of the head generated by said pumping means (12) and the head generated by rotation of the screw means (16) being less than the head generated by the pumping means (12);

wherein the first discharge device (20, 23) comprises a lower collecting tank (20) to collect the liquid part existing from said tubular screen device (14);

wherein the second discharge device (21, 22) comprises an upper chamber (21) to collect the solid particles separated from the slurry, and a discharge chute (22) to discharge the solid particles from the upper chamber (21);

wherein the first location at which the slurry is introduced to the vertical separator is below the lower collecting tank (20) and a bottom end of the screw means (16) is located above the first location;

wherein a bottom of the lower collecting tank (20) has a through hole (24) and a gasket (25) is arranged on an edge of the through hole (24) and disposed external to the tubular screen device (14) and is interposed between an outer surface of the tubular screen device (14) and the edge of the through hole (24) to seal the through hole (24) and to act as a shock absorber for purposes of dampening of vibrations caused to the tubular screen device (14) by indirect action of said screw means (16); and wherein the screw means (16) is caused to rotate by an electric motor (17) fixed to an upper portion of the tubular screen device (14) such that the screw means (16) does not extend into a lower feeding chamber (19) that is in fluid communication with the tubular screen device (14).

2. The vertical separator (10), according to claim 1, characterized in that said screw means (16), moving from the bottom to the top, are wound around said central axis (Z) in a clockwise direction, whereas said screw means (16) rotate in a counter-clockwise direction (R1); or said screw means (16), moving from the bottom to the top, are wound around said central axis (Z) in a counter-clockwise direction, whereas said screw means (16) rotate in a clockwise direction.

3. The vertical separator (10), according to claim 1, characterized in that the diameter of the inner surface of said tubular screen device (14) is greater than the outer diameter of said screw means (16).

4. The vertical separator (10), according to claim 3, characterized in that the difference between the diameter of the inner surface of the tubular screen device and the outer diameter of the screw means ranges from 1 mm to 10 mm.

5. The vertical separator (10), according to claim 1, characterized in that said tubular screen device (14) is coupled to the lower collecting tank (20) by means of the through hole (24) and the lower feeding chamber (19) lies below the lower collecting tank (20).

6. The vertical separator (10), according to claim 1, characterized in that the solid particles are smaller than 0.05 mm.

7. The vertical separator (10), according to claim 1, characterized in that the concentration of the solid particles does not exceed 5%.

8. The vertical separator (10), according to claim 1, characterized in that the speed of rotation of said screw means (16) ranges from 200 rpm and 1500 rpm.

9. The vertical separator (10), according to claim 1, characterized in that said screw means (16) has a continuous profile.

10. The vertical separator (10), according to claim 1, characterized in that said screw means comprises a plurality of modular loop assemblies, which are assembled together and are all coupled to a common central shaft.

11. A plant (100) for the treatment of slurry; said plant (100) being characterized in that said plant comprises at least one vertical separator (10) according to claim 1.

12. The vertical separator (10), according to claim 1, wherein the first discharge device (23) to discharge the liquid part after the separation is positioned at a bottom portion of the vertical separator and receives a flow of the liquid part due to the action of gravity.

13. The vertical separator (10), according to claim 1, wherein the pump (12) and the screw means (16) are oriented at an angle of 90 degrees with respect to each other.

14. The vertical separator (10), according to claim 1, wherein pressure exerted by the pump (12) decreases at a uniform rate from an inlet at a feeding end of the screen device to an outlet at the second discharge device.

15. The vertical separator (10), according to Claim 1, wherein the feeding device includes a conduit that directs the slurry into the lower feeding chamber (19) which is below the bottom end of the screw means (16) and below the lower collecting tank (20).

* * * * *